United States Patent [19]
Costello et al.

[11] Patent Number: 4,582,448
[45] Date of Patent: Apr. 15, 1986

[54] RELEASABLE WHEEL AXLE DEVICE

[76] Inventors: William D. Costello, 1081 McHugh Ct., Ventura, Calif. 93003; Charles J. Helton, III, 6750 Worth Way, Camarillo, Calif. 93010

[21] Appl. No.: 534,704

[22] Filed: Sep. 22, 1983

Related U.S. Application Data

[63] Continuation-in-part of Ser. No. 272,924, Jun. 6, 1981, abandoned.

[51] Int. Cl.⁴ .................. F16B 21/00; F16D 1/00
[52] U.S. Cl. ...................... 403/324; 403/325; 403/328; 403/24; 403/27; 280/242 WC; 297/DIG. 4; 301/132; 74/527
[58] Field of Search ............... 403/324, 325, 328, 322, 403/247, 191, 233, 24, 323, 327, 330, 27; 301/131, 132, 135; 280/242 WC; 297/DIG. 4; 74/527, 528, 529, 532

[56] References Cited

U.S. PATENT DOCUMENTS

| 903,712 | 11/1908 | Hamel | 403/322 |
| 1,833,236 | 11/1931 | Smith | 403/327 |
| 2,885,231 | 5/1959 | Smith | 403/327 |
| 2,903,907 | 9/1959 | Powell | 74/529 |
| 2,926,034 | 2/1960 | Weaver | 403/359 |
| 3,059,498 | 10/1962 | Boyd | 74/527 |
| 3,330,583 | 7/1967 | Kennedy et al. | 403/325 |
| 3,698,748 | 10/1972 | Petri | 403/328 |
| 3,893,708 | 7/1975 | Moroney | 280/242 WC |
| 4,064,768 | 12/1977 | Smith et al. | 74/529 |
| 4,280,595 | 7/1981 | Timms et al. | 74/529 |
| 4,284,284 | 8/1981 | Sides | 403/328 |
| 4,339,148 | 7/1982 | Smith et al. | 403/328 |
| 4,392,690 | 7/1983 | Anderson | 280/242 WC |
| 4,422,660 | 12/1983 | Costello et al. | 280/242 WC |
| 4,474,385 | 10/1984 | Costello et al. | 280/242 WC |

FOREIGN PATENT DOCUMENTS 28439 of 1913 United Kingdom ............... 403/191

Primary Examiner—Cornelius J. Husar
Assistant Examiner—Todd G. Williams
Attorney, Agent, or Firm—Kenneth J. Hovet

[57] ABSTRACT

An assembly for allowing quick removal of a wheel from a vehicle is provided. The original wheel axle is replaced with an elongated axle which is adapted to extend through a block clamped to the vehicle frame. The block includes a spring-biased plunger which interfits with an annular groove at the end of the axle to lock the wheel and axle in place. The plunger is withdrawn from the groove to release the axle and allow one to readily remove the wheel.

Alternately, an indented shaft fits within the groove to lock the axle. Upon rotation of the shaft to align the indentation over the groove, the axle may be released and withdrawn from the block.

11 Claims, 10 Drawing Figures

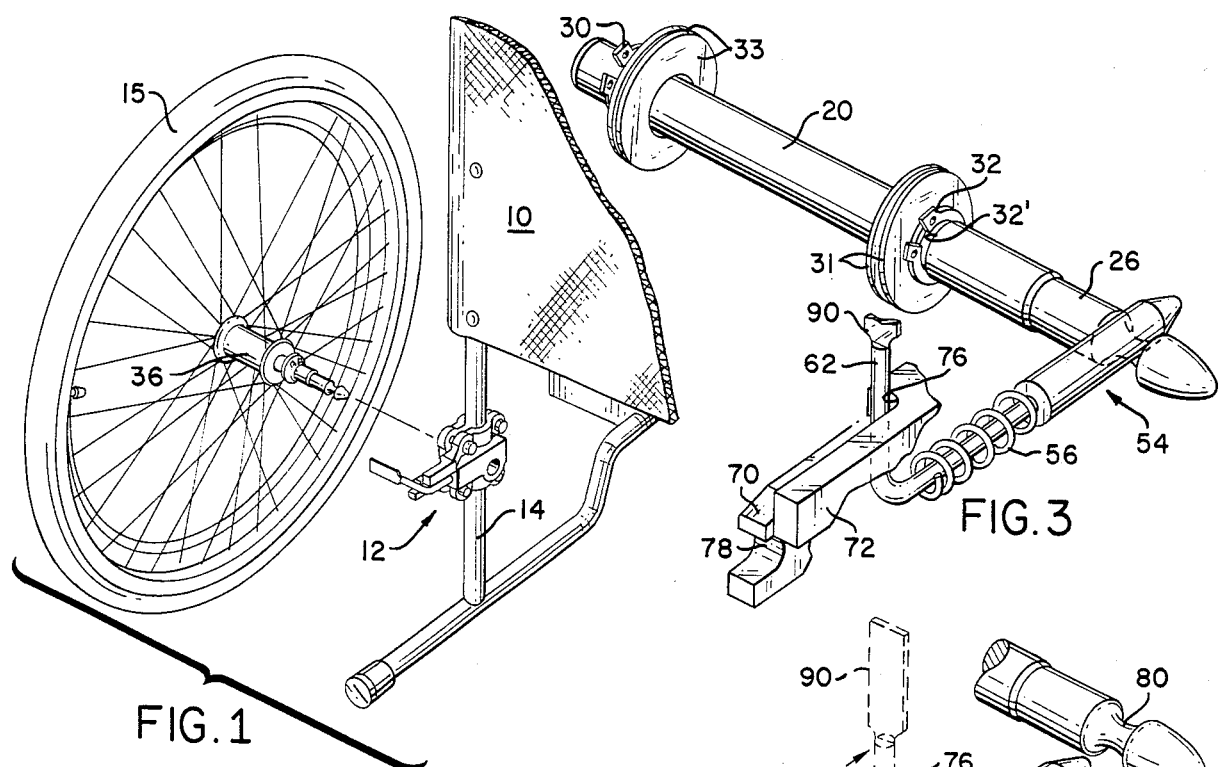
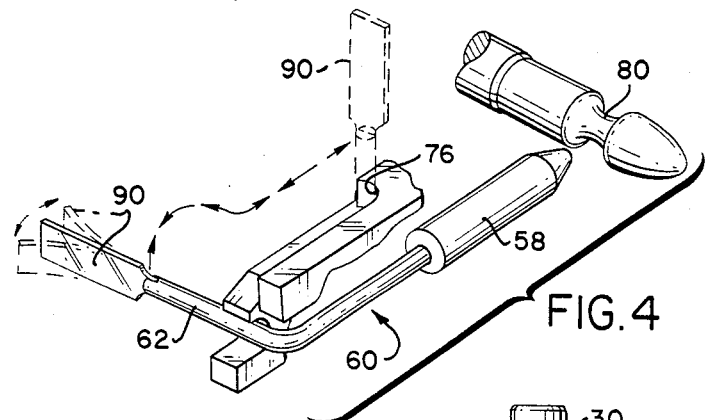
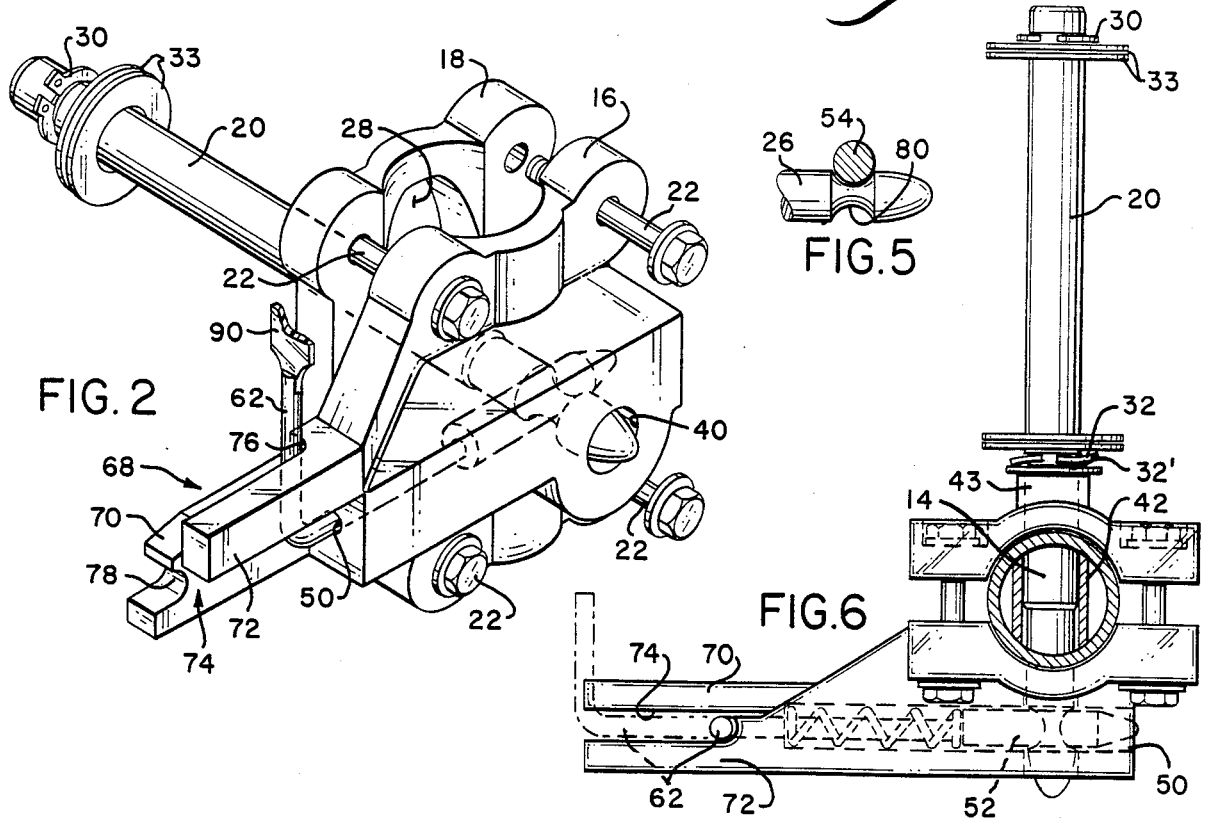

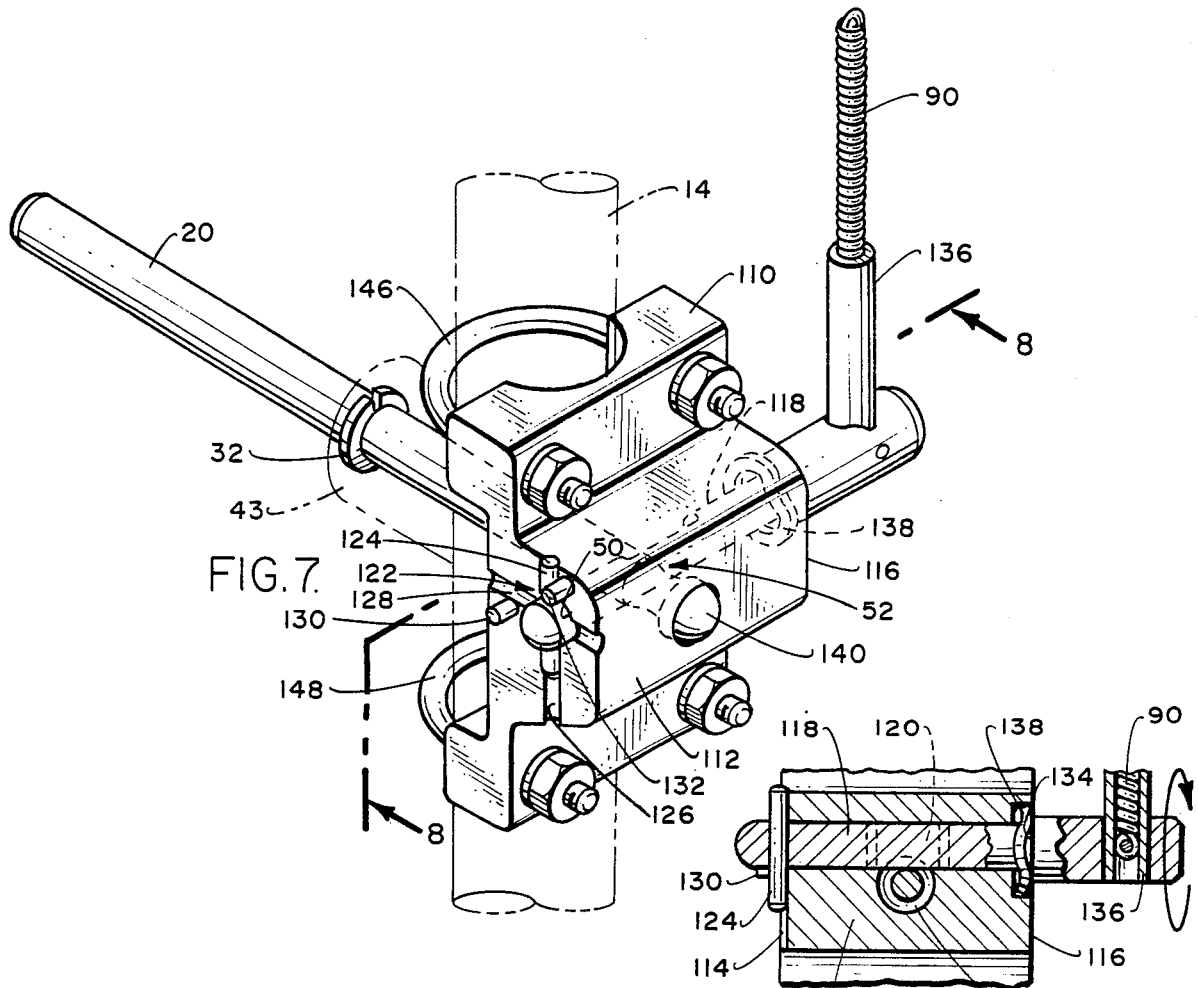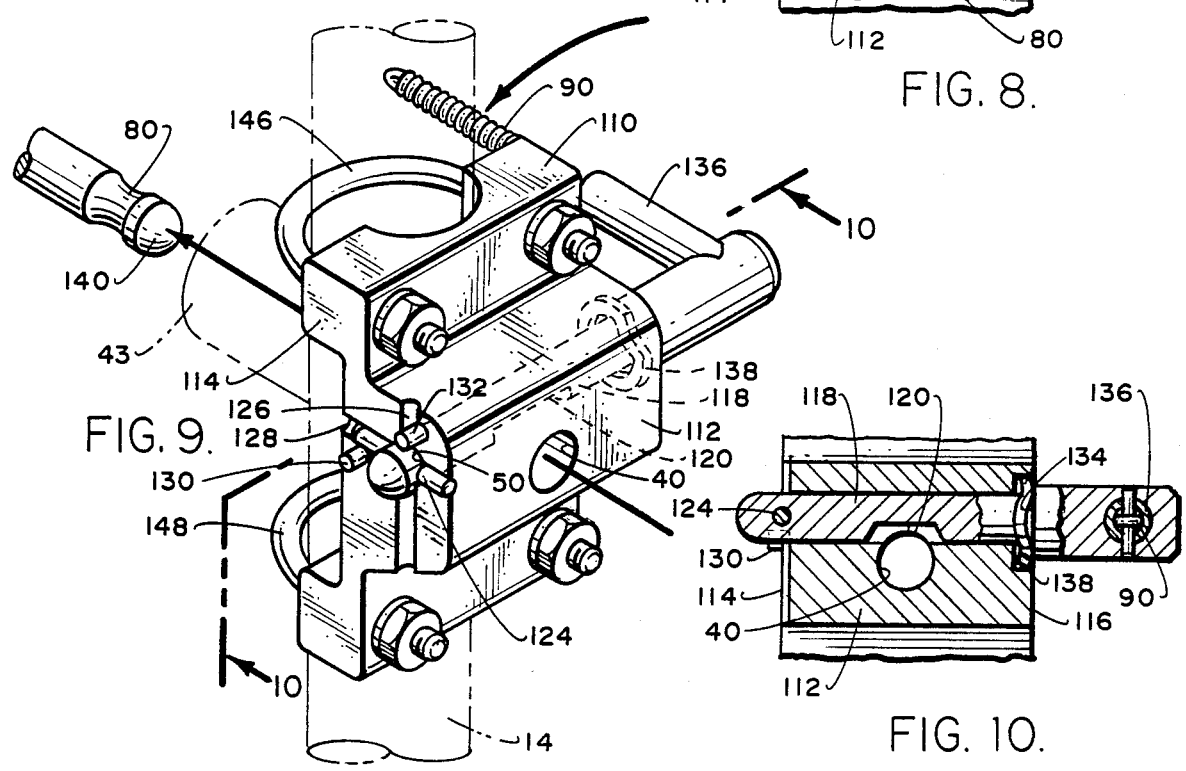

RELEASABLE WHEEL AXLE DEVICE

REFERENCE TO PRIOR APPLICATION

This application is a continuation-in-part of application Ser. No. 272,924, filed June 6, 1981, now abandoned.

BACKGROUND OF THE INVENTION

1. Field of the Invention

The present invention relates to portable vehicles having removable wheels and, more particularly, to assemblies for allowing the quick release of wheels from such vehicles.

2. Description of the Prior Art

In the use of light-duty or portable vehicles, such as bicycles, tricycles, wagons, wheelchairs and the like, it is common for one to transport the vehicle within a car. However, given the energy shortage and downscaling of personal automobiles, it is very difficult to position the aforementioned portable vehicles within the truck of a small car or the back seat thereof.

Contributing substantially to the unwieldiness of such vehicles are the large wheels commonly associated therewith. Having the ability to remove such wheels, especially from a bike, wheelchair or the like, greatly facilitates handling, movement and/or storage.

Mechanisms used for releasing at least the front wheel from the fork of a bike are known. Examples are toggle connectors, spring clips and wing nuts. In the case of wheelchairs, wagons, and certain other vehicles, however, such mechanisms do not greatly assist in solving the problem since removing the wheel still leaves an axle protruding from the vehicle frame. In such cases, the user is left in almost a worse disadvantage than if the wheels were left in place.

SUMMARY OF THE INVENTION

In accordance with the present invention, a connector assembly is provided which allows a wheel axle to be readily connected or disconnected from a vehicle frame. The axle is retained in the wheel hub when the wheel is withdrawn, thereby allowing the vehicle to be more readily stored or placed within one's automobile, storage closet or the like.

the assembly includes a replacement axle for the vehicle wheel and mounting means attached to the vehicle frame having an orfice through which an extension of the replacement axle extends. A plunger mechanism is utilized to engage the end of the axle extension and hold the wheel in place during use. The plunger mechanism includes a handle member having an upright portion that allows one to grasp the plunger and disengage its connection with the axle extension.

The plunger mechanism is spring-biased toward the connecting position and is released by pulling the upright portion along a constraining slot. The upright portion is rotated 90° to engage a detent to hold the plunger in an open position and allow withdrawal of the extension from the connector block for easy removal of the wheel from the vehicle.

Alternately, a locking means comprising an indented rotatable shaft may be used. In this case, rotation of the shaft to position the indentation over the axle extension and allow its release is all that is required.

BREIF DESCRIPTION OF THE DRAWINGS

FIG. 1 is a fragmentary exploded perspective view of the connector assembly of the present invention in use with a wheelchair;

FIG. 2 is an enlarged perspective view showing the assembly of FIG. 1;

FIG. 3 is a fragmentary broken-away view of assembly parts shown in phantom in FIG. 2;

FIG. 4 is a fragmentary view of the parts shown in FIG. 3 in a different position;

FIG. 5 is a fragmentary view showing the axle extension and plunger head in engagement;

FIG. 6 is a top plan view of the connector shown in FIG. 2;

FIG. 7 is a perspective view of an alternative embodiment of the present invention showing the assembly in a locked position;

FIG. 8 is a fragmentary cross-section taken along lines 8—8 of FIG. 7;

FIG. 9 is a perspective view of the assembly of FIG. 7 in a release position; and, FIG. 10 is a fragmentary cross-section taken along lines 10—10 of FIG. 9.

DESCRIPTION OF THE PREFERRED EMBODIMENTS

Referring now to FIG. 1 of the drawings, the connector assembly of the present invention is shown in use on a wheelchair. A connector mounting means (12) is clamped to a portion of the tubular frame (14) of wheelchair (10).

It will be appreciated that the original axle of the wheelchair, which is commonly threadedly attached to frame (14) through internally threaded sleeve (42), has been replaced with axle (20) of the present invention. Such axle includes extension (26) and is provided with split rings (30, 32) and corresponding washer assemblies (31, 33).

The split rings engage spaced-apart axle grooves (only groove 32' shown) to define a predetermined axle length within which wheel hub (36) will securely fit. The washers, of course, operate as spacers to allow for different vehicle wheel hub widths.

The mounting means includes a connector block (16) and a clamp member (18). The block and clamping member are secured to opposite sides of frame (14) with fastening means—shown in FIG. 2 as threaded bolts (22). The connector block is provided with a second orifice (40) corresponding in diameter and shape to the threaded axle extension (26). The diameter of the extension is slightly less than the inner diameter of sleeve (42).

Clamp member (18) includes large opening (28). Such opening is necessary for assembly of the wheel to the frame so that at least the ring (32) and possibly some washers (31) will pass into said opening allowing the ring (32) to abut against the frame (14). Alternately, the ring (32) may abut against an outer boss (43) of the aforementioned sleeve (42).

It will be appreciated that when the connector block is placed against frame (14), second orifice (40) will be aligned with the sleeve opening to allow insertion of the extension (26).

The connector block (16) is provided with a first longitudinal orifice (50) that, at least partially, intersects with the second orifice (40) at intersection (52). The first orifice corresponds in shape to plunger means (54) which is adapted to slide axially within said first orifice.

The plunger means includes a head member (58) and handle member (60). In the preferred embodiment, the handle member is provided with an upright portion (62) to facilitate manual grasping and for visual indication of position. The plunger means further includes spring (56) which biases the plunger means toward a second position, shown in FIGS. 2 and 3, in a manner to be hereinafter described.

The connector block also includes a lateral part shown generally by reference numeral (68). The lateral part comprises bifurcated portions (70, 72) which extend outwardly from the side of the connector block to define a slot opening (74). The lateral part further includes an abutment surface (76) and a detent means shown as an outwardly-facing recess (78) at the end of member (70).

When the plunger means is in its second position, the upright portion (62) will lie against abutment surface (76) and head member (58) will extend across the intersection (52). The slot (74) constrains the upright portion (62) in a vertical disposition when the plunger means is in the second position.

FIG. 4 shows the plunger means in its first position. In this position, the head member is out of intersection (52) and the handle upright portion lies about horizontally within recess (78).

At a predetermined location on the end portion of extension (26) is an engagement means comprising annular groove (80). The groove extends around the circumference of the extension and preferrably corresponds in shape to the cross-sectional configuration of head member (58). As shown, the groove is round and about semi-circular in shape and the head is cylindrical. In this manner, when the plunger means is in its second position, the head will interfit with the groove and form an effective connection with the extension as best shown in FIG. 5.

In a preferred embodiment of the present invention, the longitudinal axis of the first orifice (50) extends about perpendicular to the longitudinal axis of the second orifice (40). Further, the longitudinal axis of recess (78) extends about perepndicular to the longitudinal axis of orifice (50). This allows the upright portion to be disposed horizontally or parallel to the axle when in recess (78).

With reference now to the alternative embodiment shown in FIGS. 7-10, a revised connector block (110) is shown clamped to frame (14) (shown in phantom) by U-bolts (146, 148). The block includes an enlarged solid portion (112) through which extend the above described intersecting first and second orifices (50, 40). The block further includes side wall (114) and side wall (116) (not shown).

Extending through first orifice (50) is shaft (118) having indentation (120). The indentation is sized to extend across the diameter of second orifice (40) and has a depth greater than the diameter of orifice (40) and extends into and intersects with the orifice (50). In this way, when axle (20) is inserted into the orifice, it will pass beyond the shaft and intersection (52) freely without obstruction. The shaft includes a restraining means shown generally by reference numeral (122) at one end and a handle member (136) at the opposing end. The handle member extends generally about perpendicular from the shaft and includes signal means shown as spring (90) extending from the end thereof in a manner and for a purpose hereinafter described.

The restraining means includes at least one pin (124) extending transversely from the shaft and rotates therewith between constraint means. The constraint means includes one or more grooves shown by reference numerals (126, 128) in side wall (114) of the connector block. The groove (126) extends vertically from the longitudinal axis of orifice (50) and groove (128) extends horizontally therefrom. Such grooves are adapted to engage pin (124). The aforementioned handle member (136) extends from shaft (118) coextensively to pin (124). In this manner, when the shaft is rotated so that pin (124) enters groove (128), the assembly will be in a release position as shown in FIG. 9. When the handle member is upright, the pin will likewise be vertically disposed and will be in engagement with groove (126) corresponding to a locked position. The constraint means may further include abutment means shown by outwardly extending projections (130, 132). These projections extend outwardly from the side wall (114) adjacent respective grooves (126, 128). In the embodiment shown, such projections will prevent pin (124) from movement beyond the grooves (126, 128).

To ensure that the pin will be drawn into the aforementioned grooves, shaft (118) includes an annular stepped portion (134) against which spring means, shown as spring washer (138), pushes the shaft axially toward the handle member end of the shaft.

Operation of the wheel connector of the present invention will now be described. It is expected that the original axle for wheel (15) will be replaced with axle (20) of the present invention. Most commonly, the original axle is threaded at both ends with one end engaged with sleeve (42) and the opposing end retaining the wheel with a nut or the like. As such, the axle is easily removed.

The replacement axle is constructed to fit within the wheel hub and engage the wheel bearings or other wear surfaces in the same manner as the original axle. Split rings (30, 32) and removable washers (31, 33) allow for ready connection of the replacement axle to hub (36).

With replacement axle (20) in place, the mounting means (12) is connected to frame (14). The second orifice (40) of the connector block is aligned axially with the axle sleeve (42) opening that extends through frame (14). The connector block is held in place by threaded engagement to opposing clamp member (18) with the four threaded bolts (22). Of course, it is possible that block (16) could be joined directly to the frame or with clamping mechanisms known in the art other than member (18). As shown in the FIGS. 7-10 embodiment, U-bolts (146, 148) with associated nuts and washers are used.

In the FIGS. 1-6 embodiment, to allow insertion of the extension into second orifice (40), the plunger means handle is grasped and pulled axially outwardly against spring tension (56). As the upright portion (76) is pulled toward the end of bifurcated member (70), it is rotated inwardly toward wheel (15) about 90° and then allowed to be drawn into recess (78) by the aforementioned tension from spring (56). In this manner, the head member will be held out of intersection (52). Extension (26), with wheel attached, may then be inserted through the clamp member opening (28) and into the sleeve (42) until ring (32) abuts the sleeve boss (43). At this point, the groove (80) will extend across intersection (52).

In this regard, it will be noted that the axial distance between ring (32) and groove (80) is predetermined to ensure that the groove is properly located at intersection (52). As so located, the upright member (76) is pulled out of recess (78) and the plunger means is allowed to be drawn by the spring (56) into the intersection and across groove (80) for the aforementioned connection and securement of wheel (15).

In the FIGS. 7-10 embodiment, the vehicle wheel and axle assembly is the same with the axial distance between ring (32) and groove (80) being predetermined to ensure that the groove is located at intersection (52) along with the indentation (120) on shaft (118). To insert the axle extension into orifice (40), handle member (136) must be in the horizontal release position shown in FIG. 9. As so disposed, the indentation will be directly above intersection (52) and allow the head (140) of axle (20) to pass freely therethrough until it can be just seen at the outlet of orifice (40) as shown in FIG. 7. As mentioned, the distance between ring (32) and groove (80) is predetermined along with the distance from intersection (52) to the end of sleeve boss (43) shown in phantom. With the washer (32) abuted against sleeve boss (43), the groove will be properly located in intersection (52) and handle member (136) may then be rotated to a vertical lock position as shown in FIG. 7. Such rotation will move indentation (120) away from intersection (52) and allow an unindented portion of the shaft to rotate into the groove (80). In this manner, the groove will be held against axial movement and the axle is thereby locked in place.

When a user wishes to move the wheelchair into a compact car or other small storage area, the above-described procedure can be reversed allowing the wheel to be easily removed and stored separately without the added weight and cumbersome manipulation attendant to a wheelchair having opposing large diameter spoked wheels. Of course, the present invention can be utilized for one or more wheels constructed for various types of vehicles supportable by a removable axle similar to that shown in the present invention.

A further advantageous feature of the present invention involves an optioanl signal means shown by resilient member (90), such as a plastic or metallic strip or spring. This member may be secured to the end of upright portion (62) and have a length sufficient to contact portions of the wheel structure (15). In this manner, an operator will hear a clattering sound as parts of the wheel, such as spokes, impinge upon the resilient member causing a signal that the plunger means is not in engagement with the axle extension. It is then a simple matter for an operator to grasp the upright member, withdraw it from the recess, rotate it and allow it to snap into engagement for safe operation of the vehcile.

Likewise, the resilient member (90) may extend from the end of handle member (136) a distance sufficient to contact portions of the wheel. Such occurs in the release position shown in FIG. 9. Movement of the wheel will create an audible signal and alert an operator that the axle is not locked in place. In such case, the handle member may be rotated to the vertical lock position shown in FIG. 7 for subsequent safe movement of the vehicle.

While the invention has been described with respect to preferred embodiments, it will be apparent to skilled artisans that other modifications and improvements may be made without departing from the scope and spirit of the invention. Therefore, it will be understood that the invention is not to be limited by the specific illustrative embodiments, but only by the scope of the appended claims.

We claim:

1. A connector assembly for a wheel to a frame comprising:

an axle for said wheel having an extension at one end;

a mounting means attached to said frame including a connector block secured to a portion of the frame with a clamp member and fastening means, said extension extending through an opening in said frame, said block having an enlarged solid portion through which extends a first longitudinal orifice that at least partially intersects a second orifice, said extension being adapted to extend into said second orifice;

plunger means positioned in said first orifice comprising a head member and a handle member having an upright portion, said plunger means being movable axially in said first orifice between a first position out of the intersection between said first and second orifices and a second position within said intersection wherein said connector block includes a lateral part having a slot through which said upright portion extends and a recess at the end of said slot within which the upright portion rests when said plunger means is in the first position; and, extension engagement means adapted to releasably connect with said plunger means when the extension is in said second position.

2. The connector of claim 1 wherein said plunger means is spring biased toward said second position.

3. The connector of claim 1 wherein said engagement means comprises an annular groove at the end portion of said extension adapted for engagement with said head member.

4. The connector of claim 3 wherein said groove is round and said head member is cylindrical.

5. The connector of claim 1 wherein said plunger means is rotatable about its longitudinal axis and said slot constrains the handle member upright portion in a vertical position when said plunger means is at the second position, said recess having an axis about perpendicular to the plunger means axis such that the upright portion is rotated about 90° to engage said recess.

6. The connector of claim 5 wherein the longitudinal axis of the first orifice is about perpendicular to the longitudinal axis of the second orifice.

7. The connector of claim 6 wherein the handle member includes a signal means to indicate when the plunger means is in the first position.

8. A connector assembly for a wheel to a frame comprising:

an axle for said wheel having an extension at one end;

a mounting means attached to said frame including a connector block secured to a portion of the frame, said block having an enlarged portion through which extends a first longitudinal orifice that at least partially intersects a second orifice with said extension being adapted to extend into said second orifice;

locking means positioned in said first orifice comprising an indented shaft having a restraining means comprising at least one pin extending transversely from one end of said shaft and a handle at the opposing end extending perpendicularly from the longitudinal axis of said shaft adjacent the opposing block sidewall and parallel with said pin, wherein the indentation extends across the second orifice and is of sufficient depth to allow passage of said extension through said second orifice when said shaft is in a release position;

constraint means on said block including at least two grooves in the sidewall thereof each adapted to engage said pin when the shaft is rotated, one groove aligned on said sidewall to engage said pin and dispose said handle in said release position and another groove aligned on said sidewall to engage said pin and dispose said handle in a locking position, said handle including a resilient signal member extending axially from the end thereof into the wheel when the handle is in its release position; and, extension engagement means adapted to releasably connect with said locking means when the extension is positioned within the second orifice, said engagement means comprising an annular groove at the end portion of said extension adapted for engagement with an unindented portion of said shaft wherein the unindented portion extends across a portion of the second orifice and is adapted to extend into the annular groove of said extension when said extension is positioned within the second orifice and when said shaft is rotated to said locking position.

9. The connector of claim 8 wherein said constraint means includes spring means to bias said shaft axially toward said opposing end and maintain the pin in said groove.

10. The connector of claim 9 wherein there is a vertical groove and a horizontal groove, each extending radially from the longitudinal axis of the first orifice, corresponding to said lock and release position, respectively.

11. The connector of claim 10 wherein said constraint means includes an abutment means extending outwardly from the side wall of said block adjacent each of said grooves to prevent movement of said pin beyond the grooves.

* * * * *